(12) United States Patent
Choi et al.

(10) Patent No.: US 10,999,056 B2
(45) Date of Patent: *May 4, 2021

(54) APPARATUS AND METHOD FOR PERFORMING OPERATION BEING SECURE AGAINST SIDE CHANNEL ATTACK

(71) Applicant: SAMSUNG SDS CO., LTD., Seoul (KR)

(72) Inventors: Kyu-Young Choi, Seoul (KR); Duk-Jae Moon, Seoul (KR); Hyo-Jin Yoon, Seoul (KR); Ji-Hoon Cho, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 703 days.

This patent is subject to a terminal disclaimer.

(21) Appl. No.: 15/861,773

(22) Filed: Jan. 4, 2018

(65) Prior Publication Data
US 2018/0316487 A1     Nov. 1, 2018

(30) Foreign Application Priority Data
Apr. 28, 2017   (KR) .......................... 10-2017-0055699

(51) Int. Cl.
*H04L 9/00*      (2006.01)
*G06F 7/72*      (2006.01)
(Continued)

(52) U.S. Cl.
CPC ................ *H04L 9/002* (2013.01); *G06F 1/03* (2013.01); *G06F 7/723* (2013.01); *G06F 7/725* (2013.01);
(Continued)

(58) Field of Classification Search
CPC ....... H04L 9/002; H04L 9/003; H04L 9/0869; G06F 21/755
(Continued)

(56) References Cited

U.S. PATENT DOCUMENTS

| | | | | |
|---|---|---|---|---|
| 2004/0165726 | A1* | 8/2004 | Yamamichi | ............. H04L 9/085 380/277 |
| 2007/0064931 | A1* | 3/2007 | Zhu | ......................... G06F 7/725 380/30 |

(Continued)

FOREIGN PATENT DOCUMENTS

| | | |
|---|---|---|
| CA | 2 262 549 C | 6/2001 |
| EP | 2 378 707 A1 | 10/2011 |
| KR | 10-1586811 B1 | 1/2016 |

OTHER PUBLICATIONS

Communication dated Apr. 9, 2018, issued by the Korean Patent Office in counterpart Korean application No. 10-2017-0055699.
(Continued)

*Primary Examiner* — Yin Chen Shaw
*Assistant Examiner* — Angela R Holmes
(74) *Attorney, Agent, or Firm* — Sughrue Mion, PLLC

(57) ABSTRACT

An apparatus and method for performing operation being secure against side channel attack are provided. The apparatus and method generate values equal to values obtained through an exponentiation operation or a scalar multiplication operation of a point using values extracted from previously generated parameter candidate value sets and an operation secure against side-channel attack, thereby improving security against side-channel attack without degrading performance.

19 Claims, 14 Drawing Sheets

(51) Int. Cl.
  H04L 9/08      (2006.01)
  G06F 21/75     (2013.01)
  G06F 1/03      (2006.01)
  G06F 7/58      (2006.01)
  H04L 9/32      (2006.01)

(52) U.S. Cl.
  CPC ............ *G06F 21/755* (2017.08); *H04L 9/003* (2013.01); *H04L 9/0869* (2013.01); *G06F 7/588* (2013.01); *G06F 2207/7219* (2013.01); *G06F 2207/7223* (2013.01); *H04L 9/3252* (2013.01); *H04L 2209/08* (2013.01); *H04L 2209/125* (2013.01)

(58) Field of Classification Search
  USPC ........................................................ 713/189
  See application file for complete search history.

(56) References Cited

U.S. PATENT DOCUMENTS

| | | | | |
|---|---|---|---|---|
| 2008/0240443 | A1* | 10/2008 | Vuillaume | H04L 9/302 380/277 |
| 2013/0016834 | A1 | 1/2013 | Gebotys | |
| 2015/0324611 | A1 | 11/2015 | Coric et al. | |
| 2016/0277180 | A1 | 9/2016 | Wang et al. | |
| 2016/0372127 | A1* | 12/2016 | Chebiyyam | G10L 19/16 |
| 2017/0033923 | A1* | 2/2017 | Melzani | G06F 7/588 |

OTHER PUBLICATIONS

Communication dated Apr. 18, 2018, issued by the European Patent Office in counterpart European application No. 18154493.3.

Boyko, et al., "Speeding up discrete log and factoring based schemes via precomputations", Jan. 1, 1998, ECCV 2016 Conference, XP055461019, vol. 1403, 16 pages total.

Ateniese, et al., "A Low-cost Standard Signatures for Energy-Harvesting Wireless Sensor Networks," Jan. 1, 2015, ACM Transactions on Embedded Computing Systems, XP055463112, vol. V, No. N, Article A, 24 pages total.

Anonymous, "Elliptic curve point multiplication", Mar. 19, 2017, Retrieved from the Internet: URL: https://en.wikipedia.org/w/index.php?title=Elliptic_curve_point_multiplication&oldid=771094462, Retrieved on Mar. 27, 2018, XP055463171, 6 pages total.

Communication dated Jun. 4, 2018 issued by the International Searching Authority in counterpart International Patent Application No. PCT/KR2018/001583 (PCT/ISA/210).

Communication dated Jun. 4, 2018 issued by the International Searching Authority in counterpart International Patent Application No. PCT/KR2018/001583 (PCT/ISA/237).

* cited by examiner

FIG. 2

|  | 1 block | 2 block | 3 block | ... | 30 block | 31 block | 32 block |
|---|---|---|---|---|---|---|---|
| 00000000 | $r_{1,1}$ | $r_{1,2}$ | $r_{1,3}$ | ... | $r_{1,30}$ | $r_{1,31}$ | $r_{1,32}$ |
| 00000001 | $r_{2,1}$ | $r_{2,2}$ | $r_{2,3}$ | ... | $r_{2,30}$ | $r_{2,31}$ | $r_{2,32}$ |
| 00000010 | $r_{3,1}$ | $r_{3,2}$ | $r_{3,3}$ | ... | $r_{3,30}$ | $r_{3,31}$ | $r_{3,32}$ |
| ... | ... | ... | ... | ... | ... | ... | ... |
| 11111110 | $r_{255,1}$ | $r_{255,2}$ | $r_{255,3}$ | ... | $r_{255,30}$ | $r_{255,31}$ | $r_{255,32}$ |
| 11111111 | $r_{256,1}$ | $r_{256,2}$ | $r_{256,3}$ | ... | $r_{256,30}$ | $r_{256,31}$ | $r_{256,32}$ |

|  | 1 block | 2 block | 3 block | ... | 30 block | 31 block | 32 block |
|---|---|---|---|---|---|---|---|
| 00000000 | $k_{1,1}$ | $k_{1,2}$ | $k_{1,3}$ | ... | $k_{1,30}$ | $k_{1,31}$ | $k_{1,32}$ |
| 00000001 | $k_{2,1}$ | $k_{2,2}$ | $k_{2,3}$ | ... | $k_{2,30}$ | $k_{2,31}$ | $k_{2,32}$ |
| 00000010 | $k_{3,1}$ | $k_{3,2}$ | $k_{3,3}$ | ... | $k_{3,30}$ | $k_{3,31}$ | $k_{3,32}$ |
| ... | ... | ... | ... | ... | ... | ... | ... |
| 11111110 | $k_{255,1}$ | $k_{255,2}$ | $k_{255,3}$ | ... | $k_{255,30}$ | $k_{255,31}$ | $k_{255,32}$ |
| 11111111 | $k_{256,1}$ | $k_{256,2}$ | $k_{256,3}$ | ... | $k_{256,30}$ | $k_{256,31}$ | $k_{256,32}$ |

| | 1 block | 2 block | 3 block | ... | 30 block | 31 block | 32 block |
|---|---|---|---|---|---|---|---|
| 00000000 | $r_{1,1}$ | $r_{1,2}$ | $r_{1,3}$ | ... | $r_{1,30}$ | $r_{1,31}$ | $cr_{1,32}$ |
| 00000001 | $r_{2,1}$ | $r_{2,2}$ | $r_{2,3}$ | ... | $r_{2,30}$ | $r_{2,31}$ | $cr_{2,32}$ |
| 00000010 | $r_{3,1}$ | $r_{3,2}$ | $r_{3,3}$ | ... | $r_{3,30}$ | $r_{3,31}$ | $cr_{3,32}$ |
| ... | ... | ... | ... | ... | ... | ... | ... |
| 11111110 | $r_{255,1}$ | $r_{255,2}$ | $r_{255,3}$ | ... | $r_{255,30}$ | $r_{255,31}$ | $cr_{255,32}$ |
| 11111111 | $r_{256,1}$ | $r_{256,2}$ | $r_{256,3}$ | ... | $r_{256,30}$ | $r_{256,31}$ | $cr_{256,32}$ |

| | 1 block | 2 block | 3 block | ... | 30 block | 31 block | 32 block |
|---|---|---|---|---|---|---|---|
| 00000000 | $cr_{1,1}$ | $cr_{1,2}$ | $cr_{1,3}$ | ... | $cr_{1,30}$ | $cr_{1,31}$ | $cr_{1,32}$ |
| 00000001 | $cr_{2,1}$ | $cr_{2,2}$ | $cr_{2,3}$ | ... | $cr_{2,30}$ | $cr_{2,31}$ | $cr_{2,32}$ |
| 00000010 | $cr_{3,1}$ | $cr_{3,2}$ | $cr_{3,3}$ | ... | $cr_{3,30}$ | $cr_{3,31}$ | $cr_{3,32}$ |
| ... | ... | ... | ... | ... | ... | ... | ... |
| 11111110 | $cr_{255,1}$ | $cr_{255,2}$ | $cr_{255,3}$ | ... | $cr_{255,30}$ | $cr_{255,31}$ | $cr_{255,32}$ |
| 11111111 | $cr_{256,1}$ | $cr_{256,2}$ | $cr_{256,3}$ | ... | $cr_{256,30}$ | $cr_{256,31}$ | $cr_{256,32}$ |

910

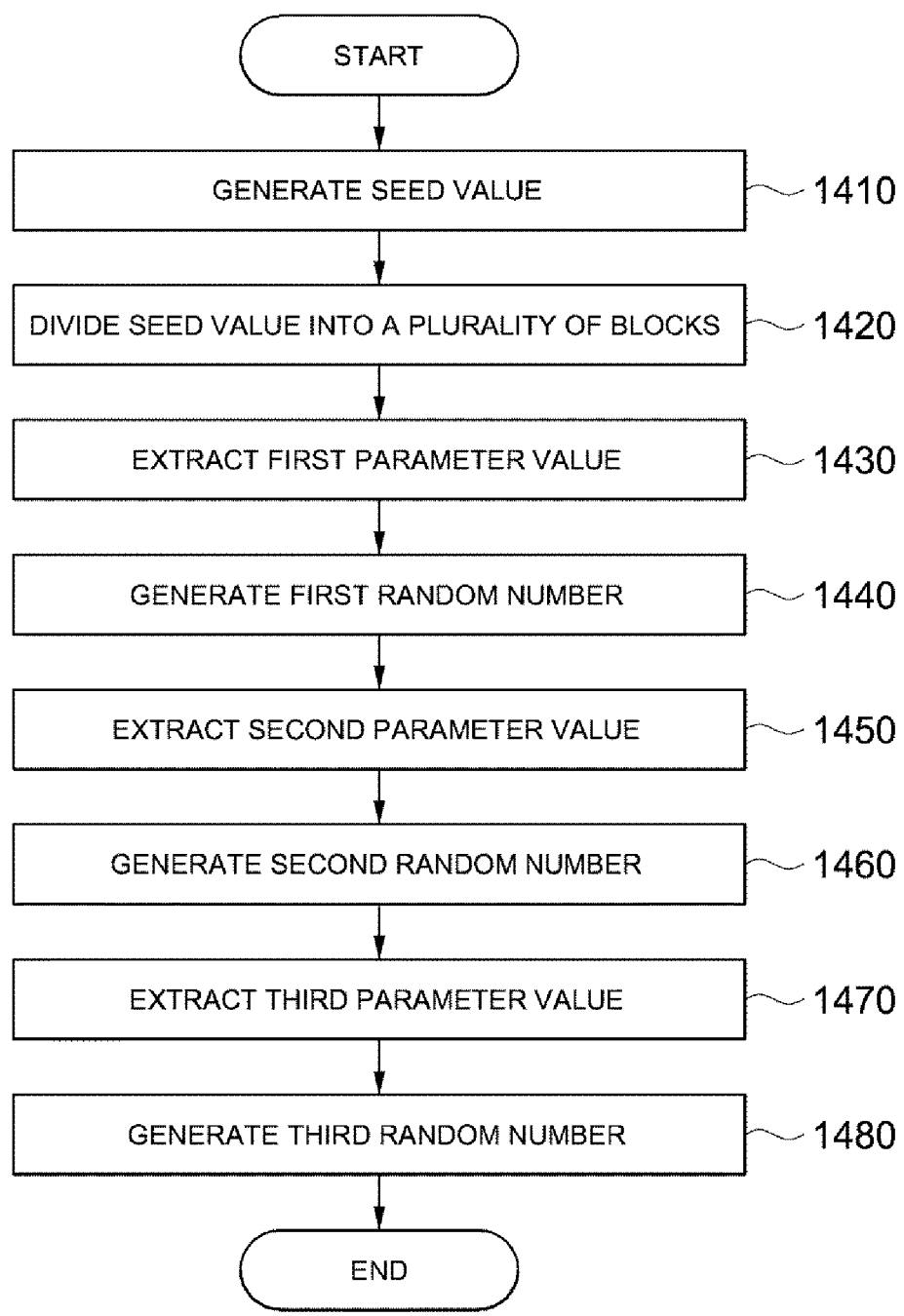

APPARATUS AND METHOD FOR PERFORMING OPERATION BEING SECURE AGAINST SIDE CHANNEL ATTACK

CROSS-REFERENCE TO RELATED APPLICATION

This application claims priority from Korean Patent Application No. 10-2017-0055699, filed on Apr. 28, 2017, the disclosure of which is incorporated herein by reference in its entirety.

BACKGROUND

1. Field

The present disclosure relates to a technology for side-channel attack prevention.

2. Discussion of Related Art

As Internet of Things (IoT) devices evolve, there is a growing risk of side-channel attacks that gain important information by exploiting physical information leaked from devices during performance of mathematical computations for a key exchange, an encryption, a digital signature for encryption, etc.

A side-channel attack obtains secret information using a leakage of side-channel information (e.g., power consumption, amount of electromagnetic radiation, algorithm execution time, etc.) for computations performed during an operation of an algorithm for key exchange, encryption, digital signature, etc.

A power analysis attack, which is a form of side-channel attack, is known as the most powerful side-channel attack, and equipment for power analysis attacks is known to be a very effective attack means because of high probability of realization with low cost. Thus, the power analysis attack is a field in which a lot of research is currently being conducted. A method of such a power analysis attack largely includes simple power analysis (SPA) and differential power analysis (DPA)

For example, an exponentiation operation or a scalar multiplication operation of a point is an essential operation in a related art encryption key exchange scheme, a public key encryption scheme, a digital signature scheme, and the like. In the case of exponentiation (or scalar multiplication) operation, when an exponent value is expressed as a bit string, a square operation and a multiplication operation are performed when each bit in the bit string is 1, and only the multiplication operation is performed when the each of the bits in the bit string is 0.

The power analysis attack exploits the different power consumption requirements for the different operations performed in the case in which each bit value is 1 and in the case in which each of the bit values is 0. That is, since the power consumption for the square operation and the subsequent multiplication operation in the case in which the bit value is 1 is large and the power consumption in the case in which the bit value is 0 is small, it is possible to obtain a secret value (a secret key and the like) by taking information on an exponent value, which is the secret value, through an analysis of power consumption occurring at a time of an exponentiation computation.

Related art methods for preventing such side-channel attacks are methods for protecting against only some side-channel attacks. However, a method to secure against all of the side-channel attacks has not been proposed. In addition, related art methods for preventing side-channel attacks have a problem in that they require a large amount of computation and thus cause performance degradation, i.e., a time delay during generation of a digital signature).

SUMMARY

According to an aspect of the exemplary embodiment, there is provided an apparatus comprising: a processor configured to execute: a seed value generator configured to generate a seed value; a divider configured to divide the seed value into a plurality of blocks; a first extractor configured to extract a plurality of first parameter values from a first parameter candidate value set including a plurality of first parameter candidate values, each of the plurality of first parameter values respectively corresponding to one of the plurality of divided blocks; a second extractor configured to extract a plurality of second parameter values from a second parameter candidate value set including a plurality of second parameter candidate values generated by using each of the plurality of first parameter candidate values included in the first parameter candidate value set, each of the plurality of second parameter values respectively corresponding to one of the plurality of divided blocks; a third extractor configured to extract a plurality of third parameter values from a third parameter candidate value set including a plurality of third parameter candidate values generated by using each of the plurality of second parameter candidate values included in the second parameter candidate value set, each of the plurality of third parameter values respectively corresponding to one of the plurality of divided blocks; and a calculator configured to generate a first random number based on the plurality of first parameter values, generate a second random number based on the plurality of second parameter values, and generate a third random number based on the plurality of third parameter values, wherein the processor is further configured to encrypt data or generate a digital signature for the data based on at least one of the first random number, the second random number and the third random number.

Each of the plurality of second parameter candidate values included in the second parameter candidate value set may be generated by performing an exponentiation operation using a corresponding one of the plurality of first parameter candidate values included in the first parameter candidate value set as an exponent or by performing a scalar multiplication operation of a point using a corresponding one of the plurality of first parameter candidate values included in the first parameter candidate value set as a scalar multiplier.

The first extractor may be further configured to extract the plurality of first parameter values respectively corresponding to bit strings of the plurality of divided blocks and positions of the blocks in the seed value, from the first parameter candidate value set, the second extractor may be further configured to extract the plurality of second parameter values respectively corresponding to bit strings of the plurality of divided blocks and positions of the blocks in the seed value, from the second parameter candidate value set, and the third extractor may be further configured to extract the plurality of third parameter values respectively corresponding to bit strings of the plurality of divided blocks and positions of the blocks in the seed value, from the third parameter candidate value set.

The calculator may generate the first random number by adding the plurality of first parameter values to each other.

The second random number may equal to a value obtainable by performing an exponentiation operation using the first random number as an exponent or by performing a scalar multiplication operation of a point using the first random number as a scalar multiplier and using the plurality of second parameter values.

At least one of the plurality of third parameter candidate values included in the third parameter candidate value set may be obtained by multiplying at least one of the second parameter candidate values included in the second parameter candidate value set by a secret key.

The third random number may equal to a product of the second random number and the secret key.

The processor may be further configured to encrypt the data or generate the digital signature for the data based on the first random number, the second random number, and the third random number.

The seed value may comprise a random bit string.

According to another aspect of the exemplary embodiment, there is provided a method, comprising: generating a seed value; dividing the seed value into a plurality of blocks; extracting a plurality of first parameter values from a first parameter candidate value set including a plurality of first parameter candidate values, each of the plurality of first parameter values respectively corresponding to one of the plurality of divided blocks; extracting a plurality of second parameter values from a second parameter candidate value set including a plurality of second parameter candidate values generated by using each of the plurality of first parameter candidate values included in the first parameter candidate value set, each of the plurality of second parameter values respectively corresponding to one of the plurality of divided blocks; extracting a plurality of third parameter values from a third parameter candidate value set including a plurality of third parameter candidate values generated by using each of the plurality of second parameter candidate values included in the second parameter candidate value set, each of the plurality of third parameter values respectively corresponding to one of the plurality of divided blocks; generating a first random number based on the plurality of first parameter values; generating a second random number based on the plurality of second parameter values; generating a third random number based on the plurality of third parameter values; and applying at least one of the first random number, the second random number and the third random number to encrypt data or generate a digital signature for the data.

Each of the plurality of second parameter candidate values included in the second parameter candidate value set is generated by performing an exponentiation operation using a corresponding one of the plurality of first parameter candidate values included in the first parameter candidate value set as an exponent or by performing a scalar multiplication operation of a point using a corresponding one of the plurality of first parameter candidate values included in the first parameter candidate value set as a scalar multiplier.

The extracting of the extracted plurality of first parameter values may extract the plurality of first parameter values respectively corresponding to bit strings of the plurality of divided blocks and positions of the blocks in the seed value, from the first parameter candidate value set, the extracting of the extracted plurality of second parameter values may extract the plurality of second parameter values respectively corresponding to bit strings of the plurality of divided blocks and positions of the blocks in the seed value, from the second parameter candidate value set, and the extracting of the extracted plurality of third parameter values may extract the plurality of third parameter values respectively corresponding to bit strings of the plurality of divided blocks and positions of the blocks in the seed value, from the third parameter candidate value set.

The generating of the first random number may generate the first random number by adding the plurality of first parameter values to each other.

The second random number may be equal to a value obtainable by performing an exponentiation operation using the first random number as an exponent or by performing a scalar multiplication operation of a point using the first random number as a scalar multiplier and using the plurality of second parameter values.

At least one of the plurality of third parameter candidate values included in the third parameter candidate value set may be values obtained by multiplying at least one of the second parameter candidate values included in the second parameter candidate value set by a secret key.

The third random number may be equal to a product of the second random number and the secret key.

The encrypting the data or the generating the digital signature may be based on the first random number, the second random number, and the third random number.

The seed value may comprise a random bit string.

According to another aspect of an exemplary embodiment, there is provided a non-transitory computer readable medium having stored thereon a program for causing a computer to execute a method, comprising: generating a seed value; dividing the seed value into a plurality of blocks; extracting a plurality of first parameter values from a first parameter candidate value set including a plurality of first parameter candidate values, each of the plurality of first parameter values respectively corresponding to one of the plurality of divided blocks; extracting a plurality of second parameter values from a second parameter candidate value set including a plurality of second parameter candidate values generated by using each of the plurality of first parameter candidate values included in the first parameter candidate value set, each of the plurality of second parameter values respectively corresponding to one of the plurality of divided blocks; extracting a plurality of third parameter values from a third parameter candidate value set including a plurality of third parameter candidate values generated by using each of the plurality of second parameter candidate values included in the second parameter candidate value set, each of the plurality of third parameter values respectively corresponding to one of the plurality of divided blocks; generating a first random number based on the plurality of first parameter values; generating a second random number based on the plurality of second parameter values; generating a third random number based on the plurality of third parameter values; and applying at least one of the first random number, the second random number and the third random number to encrypt data or generate a digital signature for the data.

According to another aspect of an exemplary embodiment, there is provided a an apparatus comprising: a processor configured to execute: receive a seed value; divide the seed value into a plurality of blocks; extract, for each of the plurality of blocks, a first parameter value from a first parameter candidate value set comprising a plurality of first parameter candidate values, by using a number of the respective block and a value in the respective block as a first index; extract, for each of the plurality of blocks, a second parameter value from a second parameter candidate value set comprising a plurality of second parameter candidate values generated by using the plurality of first parameter candidate values, by using a number of the respective block and a value in the respective block as a second index; extract, for each of the plurality of blocks, a third parameter value from a third parameter candidate value set comprising a plurality of third parameter candidate values generated by using the plurality of second parameter candidate values, by using a number of the respective block and a value in the respective block as a first third; generate a first random number based on the first parameter values for each of the plurality of blocks; generate a second random number based on the second parameter values for each of the plurality of blocks; generate a third random number based on the third parameter values for each of the plurality of blocks; and apply at least one of the first random number, the second random number and the third random number to encrypt data or generate a digital signature for the data.

At least one of a number of the first parameter candidate values included in the first parameter candidate value set, a number of the second parameter candidate values included in the second parameter candidate value set, and a number of the third parameter candidate values included in the third parameter candidate value set, may change according to a length of the seed value and a total number of the plurality of blocks.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 2 is a table showing one example of a second parameter candidate value set according to an exemplary embodiment of the present disclosure;

FIG. 5 is a table showing an example of a first parameter candidate value set according to an exemplary embodiment of the present disclosure;

FIG. 8 is a table showing one example of a third parameter candidate value set according to an exemplary embodiment of the present disclosure;

FIG. 9 is a table showing another example of the third parameter candidate value set according to an exemplary embodiment of the present disclosure;

FIG. 14 is a flowchart illustrating a computation method according to still another exemplary embodiment of the present disclosure.

DETAILED DESCRIPTION OF EXEMPLARY EMBODIMENTS

Hereinafter, detailed exemplary embodiments of the present disclosure will be described with reference to the accompanying drawings. The following detailed description is provided for a more comprehensive understanding of methods, devices, and/or systems described in this specification. However, the methods, devices, and/or systems are only examples, and the present disclosure is not limited thereto.

In the description of the present disclosure, detailed descriptions of related well-known functions that are determined to unnecessarily obscure the gist of the present disclosure will be omitted. Some terms described below are defined in consideration of functions thereof in the present disclosure, and meanings thereof may vary depending on, for example, a user or operator's intention or custom. Therefore, the meanings of terms should be interpreted on the basis of the scope throughout this specification. The terminology used in the detailed description is provided only to describe exemplary embodiments of the present disclosure and not for purposes of limitation. Unless the context clearly indicates otherwise, the singular forms include the plural forms. It should be understood that the terms "comprises" or "includes," when used herein. specify the presence of some features, numbers, steps, operations, elements, and/or combinations thereof, but do not preclude the presence or possibility of addition of one or more other features, numbers, steps, operations, elements, and/or combinations thereof.

Figure 1:
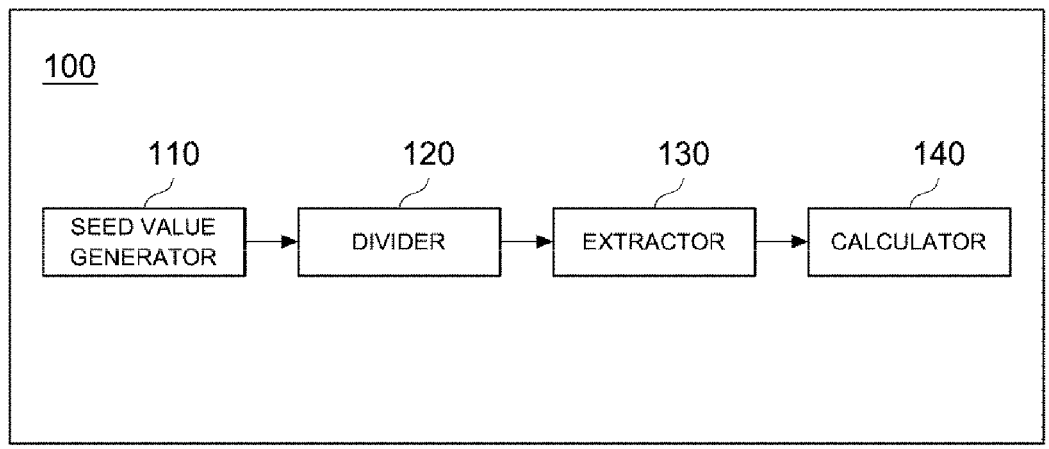
FIG. 1 is a configuration diagram illustrating a computation apparatus according to exemplary embodiment of the present disclosure.

FIG. 1 is a configuration diagram illustrating a computation apparatus according to an exemplary embodiment of the present disclosure.

Referring to FIG. 1, a computation apparatus 100 according to ab exemplary embodiment of the present disclosure includes a seed value generator 110, a divider 120, an extractor 130, and a calculator 140.

The seed value generator 110 generates a seed value. According to an exemplary embodiment, the seed value may be formed by a random bit string.

In this case, the seed value generator 110 may generate the seed value, for example, by sequentially generating arbitrary bit values.

In another example, the seed value generator 110 may generate the seed value by converting an ID obtained from an external device into an arbitrary bit string. In this case, a hash function, for example, SHA-256, may be used to convert the obtained ID into the arbitrary bit string.

However, a seed value generation method of the seed value generator 110 is not particularly limited, and the seed value generator 110 may generate the seed value using various known methods capable of generating a bit string of a predetermined length.

The divider 120 divides the seed value generated by the seed value generator 110 into a plurality of blocks.

Specifically, according to an exemplary embodiment of the present disclosure, the divider 120 may divide the seed value by a predetermined size to generate the plurality of blocks. In this case, the number of blocks generated by the divider 120 may be changed according to an exemplary embodiment.

For example, when the seed value generated by the seed value generator 110 is a bit string with a length of 256 bits, the divider 120 may divide the seed value into units of 8 bits to generate 32 blocks.

The extractor 130 extracts a plurality of second parameter values that respectively correspond to the plurality of blocks, which are generated by the divider 120, from a second parameter candidate value set including second parameter candidate values generated by using each of a plurality of first parameter candidate values.

In this case, according to an exemplary embodiment of the present disclosure, the plurality of first parameter candidate values may be random values generated in advance and stored in a storage.

In addition, according to an exemplary embodiment of the present disclosure, the second parameter candidate values included in the second parameter candidate value set may be values obtained in advance through an exponentiation operation using each of the plurality of first parameter candidate values as an exponent or through a scalar multiplication operation of a point using each of the plurality of first parameter candidate values as a scalar multiplier.

According to an exemplary embodiment of the present disclosure, the second parameter candidate value set may include $2^n \times m$ second parameter candidate values. Here, m represents the number of blocks generated by the divider 120, and n represents a length of a bit string included in each of the generated blocks. That is, the number of the second parameter candidate values included in the second parameter candidate value set may be changed according to the length of the seed value generated by the seed value generator 110 and the number of blocks generated by the divider 120.

According to an exemplary embodiment of the present disclosure, the extractor 130 may extract second parameter values respectively corresponding bit strings in the plurality of blocks generated by the divider 120 and positions of the blocks in the seed value, from the second parameter candidate value set.

Specifically, each second parameter candidate value included in the second parameter candidate value set may be indexed to one of $2^n$ different bit strings, each having a length of n bits, and a position of a block including the one of $2^n$ different bit strings in the seed value. Accordingly, the extractor 130 may compare the bit string included in each of the blocks generated by the divider 120 and the position of each of the blocks in the seed value with an index value of each of the second parameter candidate values included in the second parameter candidate value set to extract a corresponding second parameter value as a second parameter value.

FIG. 2 is a table showing one example of the second parameter candidate value set according to an exemplary embodiment of the present disclosure.

In the example shown in FIG. 2, a seed value generated by the seed value generator 110 has a length of 256 bits and that the divider 120 divides the seed value into 32 blocks, each having a length of 8 bits. Thus, the second parameter candidate value set 210 shown in FIG. 2 includes $2^8 \times 32$ second parameter candidate values.

Specifically, a second parameter candidate value $r_{i,j}$ may be generated through, for example, an exponentiation operation using a first parameter candidate value $k_{i,j}$ as an exponent, as shown in the following Equation 1.

$$r_{i,j} = g^{k_{i,j}} \bmod p \qquad \text{[Equation 1]}$$

In Equation 1, p represents an arbitrary prime number and g represents a generator of a multiplicative group having p as an order.

In another example, the second parameter candidate value $r_{i,j}$ may be generated by performing a scalar multiplication operation of a point using the first parameter candidate value $k_{i,j}$ as a scalar multiplier as shown in Equation 2 and Equation 3.

$$k_{i,j} \cdot P = (x_{i,j}, y_{i,j}) \qquad \text{[Equation 2]}$$

$$r_{i,j} = x_{i,j} \bmod p \qquad \text{[Equation 3]}$$

In Equations 2 and 3, p represents an arbitrary prime number and P represents a generator of an additive group having p as an order.

Meanwhile, each of the second parameter candidate values included in a second parameter candidate value set 210 corresponds to one of 256 bit strings, each having a length of 8 bits, and a position of a block including the corresponding bit string in the seed value.

Specifically, $r_{1,1}$ is a second parameter candidate value indexed to a bit string of 00000000 and the first block (i.e., 1 block) in the seed value, $r_{256,32}$ is a second parameter candidate value indexed to a bit string of 11111111 and the $32^{nd}$ block (i.e., 32 block) in the seed value.

Figure 3:
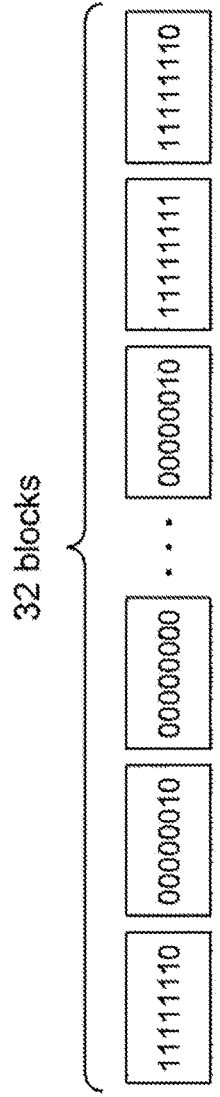
FIG. 3 is a diagram illustrating an example of an extraction of the second parameter value according to an exemplary embodiment of the present disclosure.

FIG. 3 is a diagram illustrating an example of an extraction of a second parameter value according to an exemplary embodiment of the present disclosure.

In the example shown in FIG. 3, a seed value 310 generated by the seed value generator 110 has a length of 256 bits and that the divider 120 divides the seed value 310 into 32 blocks, each having a length of 8 bits. In addition, a second parameter candidate value set 330 is the same as the second parameter candidate value set 210 shown in FIG. 2. According to another exemplary embodiment, the second parameter candidate value set 330 may be different from the second parameter candidate value set 210 shown in FIG. 2.

In the example shown in FIG. 3, since a bit string included in the first block of the 32 blocks generated by dividing the seed value 310 is "1111110," the extractor 130 may extract a second parameter candidate value $r_{255,1}$ corresponding to "1 block" and the bit string of "1111110" from the second parameter candidate value set 330 as a second parameter value corresponding to the first block.

In addition, since a bit string included in the second block of the blocks generated by dividing the seed value 310 is "00000010," the extractor 130 may extract a second parameter candidate value $r_{3,2}$ corresponding to "2 block" and the bit string of "00000010" from the second parameter candidate value set 330 as a second parameter value corresponding to the second block.

In the same way, the extractor 130 may extract second parameter values that respectively correspond to the 32 blocks generated by dividing the seed value 310 from the second parameter candidate value set 330.

Accordingly, $\{r_{255,1}, r_{3,2}, r_{1,3}, \ldots, r_{3,30}, r_{256,31}, r_{255,32}\}$ are obtained as the second parameter values extracted by the extractor 130 in the example shown in FIG. 3.

Referring back to FIG. 1, the calculator 140 generates a random number using the second parameter values extracted by the extractor 130.

In this case, according to an exemplary embodiment of the present disclosure, the calculator 140 may generate the random number by multiplying or adding the second parameter values extracted from the second parameter candidate value set.

For example, when the second parameter candidate value set includes second parameter candidate values generated by performing an exponentiation operation using the first parameter candidate values, as shown in the foregoing Equation 1, the calculator 140 may use the following Equation 4 to generate a random number r from the second parameter values extracted from the example shown in FIG. 3.

$$r = r_{255,1} \times r_{3,2} \times r_{1,3} \times \ldots \times r_{3,30} \times r_{256,31} \times r_{255,32} \quad \text{[Equation 4]}$$

When the foregoing Equation 1 is applied to Equation 4, Equation 4 may be expressed as the following Equation 5.

$$r = g^{(k_{255,1} + k_{3,2} + k_{1,3} + \ldots + k_{3,30} + k_{256,32} + k_{255,32})} \bmod p = g^k \bmod p \quad \text{[Equation 5]}$$

That is, the random number r generated by Equation 4 is the same as a value obtained by performing an exponentiation operation which uses k, which is the sum of the first parameter candidate values of $\{k_{255,1}, k_{3,2}, k_{1,3}, \ldots, k_{3,30}, k_{256,31}, k_{255,32}\}$ that are used as exponents to generate the second parameter values extracted by the extractor 130.

In another example, when the second parameter candidate value set includes second parameter candidate values generated by performing, for example, a scalar multiplication operation of a point which uses the first parameter candidate values, as shown in the foregoing Equations 2 and 3, the calculator 140 may use the following Equation 6 to generate the random number r from the second parameter values extracted in the example shown in FIG. 3.

$$r = r_{255,1} + r_{3,2} + r_{1,3} + \ldots + r_{3,30} + r_{256,31} + r_{255,32} \quad \text{[Equation 6]}$$

When the foregoing Equation 3 is applied to Equation 6, Equation 6 may be expressed as the following Equation 7.

$$r = (x_{255,1} + x_{3,2} + x_{1,3} + \ldots + x_{3,30} + x_{256,31} + x_{255,32}) \bmod p \quad \text{[Equation 7]}$$

In addition, it can be seen from Equation 2 that $(x_{255,1} + x_{3,2} + x_{1,3} + \ldots + x_{3,30} + x_{256,31} + x_{255,32})$ in Equation 7 is the same as a value obtained using a scalar multiplication operation of a point shown in the following Equation 8.

$$(k_{255,1} + k_{3,2} + k_{1,3} + \ldots + k_{3,30} + k_{256,31} + k_{255,32}) \cdot P = k \cdot P \quad \text{[Equation 8]}$$

Accordingly, the random number r generated by Equation 6 is the same as the value obtained by performing the scalar multiplication operation of a point which uses k, which is the sum of the first parameter candidate values of $\{k_{255,1}, k_{3,2}, k_{1,3}, \ldots, k_{3,30}, k_{256,31}, k_{255,32}\}$ that are used as scalar multipliers to generate the second parameter values extracted by the extractor 130.

According to another exemplary embodiment, the calculator 140 may generate the random number r using various forms of one-way function other than the addition or multiplication of the second parameter values, as shown in the foregoing Equation 4 and Equation 6.

Furthermore, according to an exemplary embodiment of the present disclosure, the calculator 140 may encrypt data or generate a digital signature using the generated random number r.

Specifically, the calculator 140 may encrypt data or generate a digital signature using various types of encryption algorithm or digital signature generation algorithm which require an exponentiation operation or a scalar multiplication operation of a point for encryption or digital signature generation. In this case, the calculator 140 may not directly perform the exponentiation operation or the scalar multiplication operation of a point. But instead, the calculator 140 may use the random number r as a resulting value of the exponentiation operation or the scalar multiplication operation of a point. In this manner, according to an exemplary embodiment, since a direct exponentiation operation or a direct scalar multiplication operation of a point is not performed for a key exchange, an encryption, or a digital signature for encryption, exploitation of physical information leaked from devices by side-channel attacks during performance of mathematical computations is prevented.

For example, in the case of an identification (ID) based public key encryption, a public key of a recipient may be generated from an ID of a recipient of encrypted data, and the encrypted data which is encrypted using the generated public key is transmitted to the recipient. In this case, the seed value generator 110 may generate a seed value by converting the ID of the recipient into a random bit string, and the divider 120 may divide the generated seed value into a plurality of blocks. Thereafter, the extractor 130 may extract second parameter values that correspond to the respective generated blocks, from the second parameter candidate value set, and the calculator 140 may generate the random number r using the second parameter values and use the generated random number r as the public key of the recipient. In this case, the second parameter candidate value set may be generated in advance by an external device, such as a key generation server, and provided by performing a secure channel.

As a specific example, the calculator 140 may generate the following ciphertext C1 by selecting an arbitrary random number t.

$$C1 = g^t (\bmod p)$$

Then, the calculator 140 may generate the following ciphertext C2 using the random number r, which is generated using the second parameter values extracted from the second parameter candidate value set, as a public key pk.

$$C2 = (pk^t \bmod p) \text{XOR } M = ((g^x)^t \bmod p) \text{XOR } M$$

Here, M represents a message to be sent and x represents a secret key of the recipient to which the data is transmitted.

Meanwhile, in an exemplary embodiment, the seed value generator 110, the divider 120, the extractor 130, and the calculator 140, which are shown in FIG. 1, may be implemented on one or more computing devices including one or more processors and a computer-readable recording medium connected to the one or more processors. The computer-readable recording medium may be provided inside or outside the processor, and may be connected to the processor by various well-known means. The processor in the computing device may enable the computing device to operate according to the exemplary embodiments described in the specification. For example, the processor may execute instructions stored in the computer readable recording medium, and the instructions stored in the computer readable recording medium may cause a series of operational steps to be performed on the computing device according to the exemplary embodiments of the present disclosure described in the specification when executed by the processor.

Figure 4:
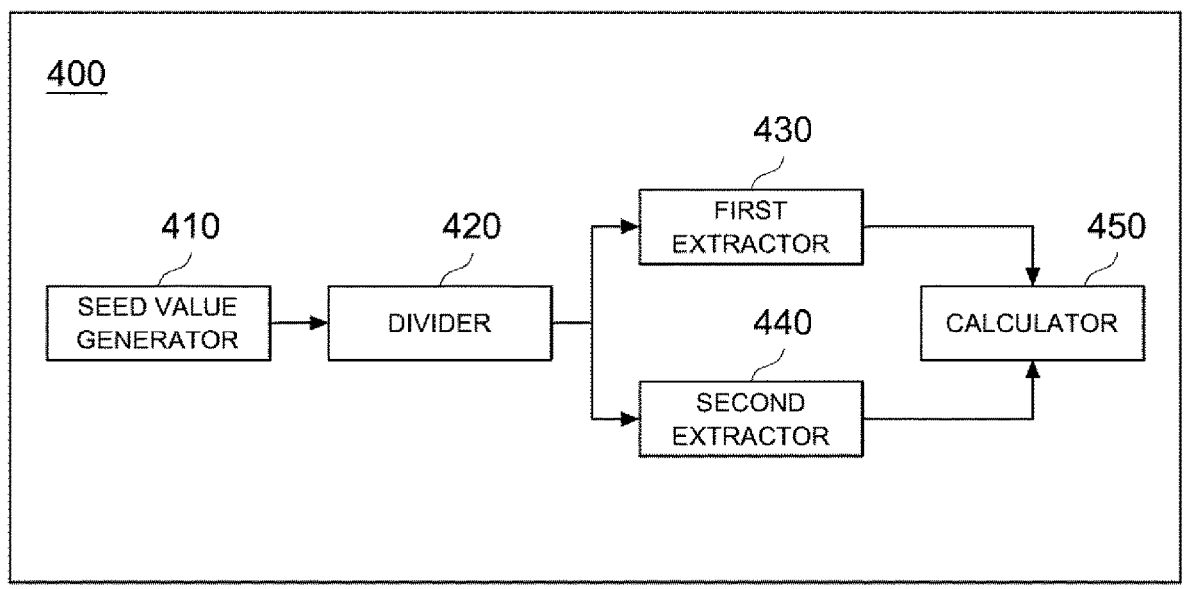
FIG. 4 is a configuration diagram illustrating a computation apparatus according to another exemplary embodiment of the present disclosure.

FIG. 4 is a configuration diagram illustrating a computation apparatus according to another exemplary embodiment of the present disclosure.

Referring to FIG. 4, a computation apparatus 400 according to another exemplary embodiment of the present disclosure includes a seed value generator 410, a divider 420, a first extractor 430, a second extractor 440, and a calculator 450.

In the example shown in FIG. 4, the seed value generator 410, the divider 420, and the second extractor 440 have the same configurations as those of the seed value generator 110, the divider 120, and the extractor 130 of FIG. 1, respectively, and thus detailed descriptions thereof will not be reiterated.

The first extractor 430 extracts a plurality of first parameter values that respectively correspond to a plurality of blocks generated by the divider 420 from a first parameter candidate value set including a plurality of first parameter candidate values. According to an exemplary embodiment, the plurality of first parameter candidate values may be the same values used to generate each of the second parameter candidate values included in the above-described second parameter candidate value set in FIGS. 2 and 3.

In this case, according to an exemplary embodiment of the present disclosure, the first parameter candidate value set may include $2^n \times m$ first parameter candidate values. Moreover, the number of the first parameter candidate values included in the first parameter candidate value set may be changed according to a length of the seed value generated by the seed value generator 410 and the number of blocks generated by the divider 420.

According to an exemplary embodiment, the first extractor 430 may extract first parameter values respectively corresponding to bit strings in the plurality of blocks generated by the divider 420 and positions of the blocks in the seed value from the first parameter candidate value set.

Specifically, each first parameter candidate value included in the first parameter candidate value set may be indexed to one of $2^n$ different bit strings, each having a length of n bits, and a position of a block including the one of $2^n$ different bit strings in the seed value.

Accordingly, the first extractor 430 may compare the bit string included in each of the blocks generated by the divider 420 and the position of each of the blocks in the seed value with an index value of each of the first parameter candidate values included in the first parameter candidate value set to extract the corresponding first parameter candidate value as a first parameter value.

Meanwhile, each of the first parameter candidate values included in the first parameter candidate value set may have the same index value as that of a corresponding second parameter candidate value included in the second parameter candidate value set.

FIG. 5 is a table showing an example of the first parameter candidate value set according to an exemplary embodiment of the present disclosure.

Specifically, FIG. 5 shows an example of the first parameter candidate value set including first parameter candidate values used to generate each of the second parameter candidate values included in the second parameter candidate value set shown in FIG. 2.

That is, a first parameter candidate value $k_{1,1}$ shown in FIG. 5 is a first parameter candidate value used to generate the second parameter candidate value $r_{1,1}$ shown in FIG. 2, and the first parameter candidate value $k_{1,1}$ is indexed to a bit string of "00000000" and the first block (i.e., 1 block) within the seed value in the same way as the second parameter candidate value $r_{1,1}$.

Similarly, a first parameter candidate value $k_{3,3}$ shown in FIG. 5 is a first parameter candidate value used to generate a second parameter candidate value $r_{3,3}$ shown in FIG. 2 and is indexed to a bit string of "00000010" and the third block (i.e., 3 block) within the seed value in the same way as the second parameter candidate value $r_{3,3}$.

Figure 6:
FIG. 6 is a diagram illustrating one example of an extraction of the first parameter value according to an exemplary embodiment of the present disclosure.

FIG. 6 is a diagram illustrating one example of an extraction of the first parameter value according to an exemplary embodiment of the present disclosure.

In the example shown in FIG. 6, a seed value 610 is the same as the seed value 310 shown in FIG. 3 and that the divider 420 divides the seed value 610 into 32 blocks, each having a length of 8 bits. In addition, a first parameter candidate value set 630 is the same as the first parameter candidate value set 510 shown in FIG. 1. However, according to another exemplary embodiment, the first parameter candidate value set 630 may be different from the first parameter candidate value set 510 shown in FIG. 1.

In the example shown in FIG. 6, when a bit string included in the first block of the 32 blocks generated by dividing the seed value 610 is "1111110," the first extractor 430 may extract a first parameter candidate value $k_{255,1}$ corresponding to "1 block" and the bit string of "1111110" from the first parameter candidate value set 630 as a first parameter value corresponding to the first block.

In addition, when a bit string included in the second block of the blocks generated by dividing the seed value 610 is "00000010," the first extractor 430 may extract a first parameter candidate value $k_{3,2}$ corresponding to "2 block" and the bit string of "00000010" from the first parameter candidate value set 630 as a first parameter value corresponding to the second block.

In the same way, the first extractor 430 may extract parameter values that respectively correspond to the 32 blocks generated by dividing the seed value 610 from the first parameter candidate value set 630.

Accordingly, $\{k_{255,1}, k_{3,2}, k_{1,3}, \ldots, k_{3,30}, k_{256,31}, k_{255,32}\}$ are obtained as the first parameter values extracted by the first extractor 430 in the example shown in FIG. 6.

Referring back to FIG. 4, the calculator 450 generates a first random number using the first parameter values extracted by the first extractor 430, and generates a second random number using the second parameter values extracted by the second extractor 440.

In this case, according to an exemplary embodiment of the present disclosure, the calculator 450 may generate a first random number by adding the first parameter values extracted from the first parameter candidate value set to each other.

For example, the calculator 450 may generate a first random number k from the first parameter values extracted in the example shown in FIG. 6 using the following Equation 9.

$$k = k_{255,1} + k_{3,2} + k_{1,3} + \ldots + k_{3,30} + k_{256,31} + k_{255,32} \quad \text{[Equation 9]}$$

Meanwhile, the calculator 450 may generate the first random number k using various types of one-way function in addition to the foregoing Equation 9.

For example, when the second parameter candidate value set includes second parameter candidate values generated by performing an exponentiation operation using the first parameter candidate values, as shown in the foregoing Equation 1, the calculator 450 may use the foregoing Equation 4 to generate a second random number r from the second parameter values extracted in the example shown in FIG. 3.

In another example, when the second parameter candidate value set includes second parameter candidate values generated by performing, for example, a scalar multiplication operation of a point which uses the first parameter candidate values, as shown in the foregoing Equations 2 and 3, the calculator 140 may use the foregoing Equation 6 to generate the second random number r from the second parameter values extracted in the example shown in FIG. 3.

Meanwhile, according to an exemplary embodiment of the preset disclosure, the calculator 450 may encrypt data or generate a digital signature using the generated second random number r.

Specifically, the calculator 450 may encrypt data or generate a digital signature using various types of encryption algorithm or digital signature generation algorithm which require an exponentiation operation or a scalar multiplication operation of a point for encryption or digital signature generation. In this case, the calculator 450 may not directly perform the exponentiation operation or the scalar multiplication operation of a point but may use the second random number r as a resulting value of the exponentiation operation or the scalar multiplication operation of a point.

In this manner, according to an exemplary embodiment, since a direct exponentiation operation or a direct scalar multiplication operation of a point is not performed for a key exchange, an encryption, or a digital signature for encryption, exploitation of physical information leaked from devices by side-channel attacks during performance of mathematical computations is prevented.

For example, the calculator 450 may generate a digital signature using a digital signature algorithm (DSA), which is one digital signature scheme.

Specifically, a digital signature according to a DSA is generated as follows:

1) The random integer k is selected ($k \in [1, q-1]$)
2) $r = (g^k \mod p) \mod q$ is computed (where p is an arbitrary prime number, q is a prime divisor of p−1, and g is a generator of a multiplicative group having p as an order)
3) $s = k^{-1}(H(m) + cr) \mod q$ is computed (where c is a secret key, m is a message, and H( ) is a hash function)
4) A signature value (r,s) is output for a message.

In this case, the calculator 450 may use the first random number as the random integer k and use the second random number as the signature value r. That is, the signature value r may be obtained by performing an operation, such as a multiplication operation, which is secure against side-channel attack and uses the second parameter values extracted from the second parameter candidate value set, rather than by performing an exponentiation operation using the random integer k. Accordingly, the random integer k used to generate the signature value r cannot be obtained by performing a side-channel attack, and the secret key c used for generating the signature value s is also secured.

In another example, the calculator 450 may generate a digital signature using an elliptic curve digital signature algorithm (ECDSA), which is one digital signature scheme.

Specifically, a digital signature according to the ECDSA is generated as follows:

1) The random integer k ($k \in [1, q-1]$) is selected (where q is a prime divisor of p−1 and p is an arbitrary prime number)
2) $k \cdot P = (x, y)$ is computed (where P is a generator of an additive group having p as an order)
3) $r = x \mod p$ is computed
4) $s = k^{-1}(H(m) + cr) \mod (p-1)$ is computed (where c is a secret key, m is a message, and H( ) is a hash function)
5) The signature value (r,s) is output for a message In this case, the calculator 450 may use the first random number as the random integer k and use the second random number as the signature value r. That is, the signature value r may be obtained by performing an operation, such as an addition operation, which is secure against side-channel attack and uses the second parameter values extracted from the second parameter candidate value set, rather than by performing a scalar multiplication operation of a point using the random integer k. Accordingly, the random integer k used to generate the signature value r cannot be obtained by performing a side-channel attack, and the secret key c used for generating the signature value s is also secured.

In an exemplary embodiment, the seed value generator 410, the divider 420, the first extractor 430, the second extractor 440, and the calculator 450, which are shown in FIG. 4, may be implemented on one or more computing devices including one or more processors and a computer-readable recording medium connected to the one or more processors. The computer-readable recording medium may be provided inside or outside the processor, and may be connected to the processor by various well-known means. The processor in the computing device may enable the computing device to operate according to the exemplary embodiments described in the specification. For example, the processor may execute instructions stored in the computer readable recording medium, and the instructions stored in the computer readable recording medium may cause a series of operational steps to be performed on the computing device according to the exemplary embodiments of the present disclosure described in the specification when executed by the processor.

Figure 7:
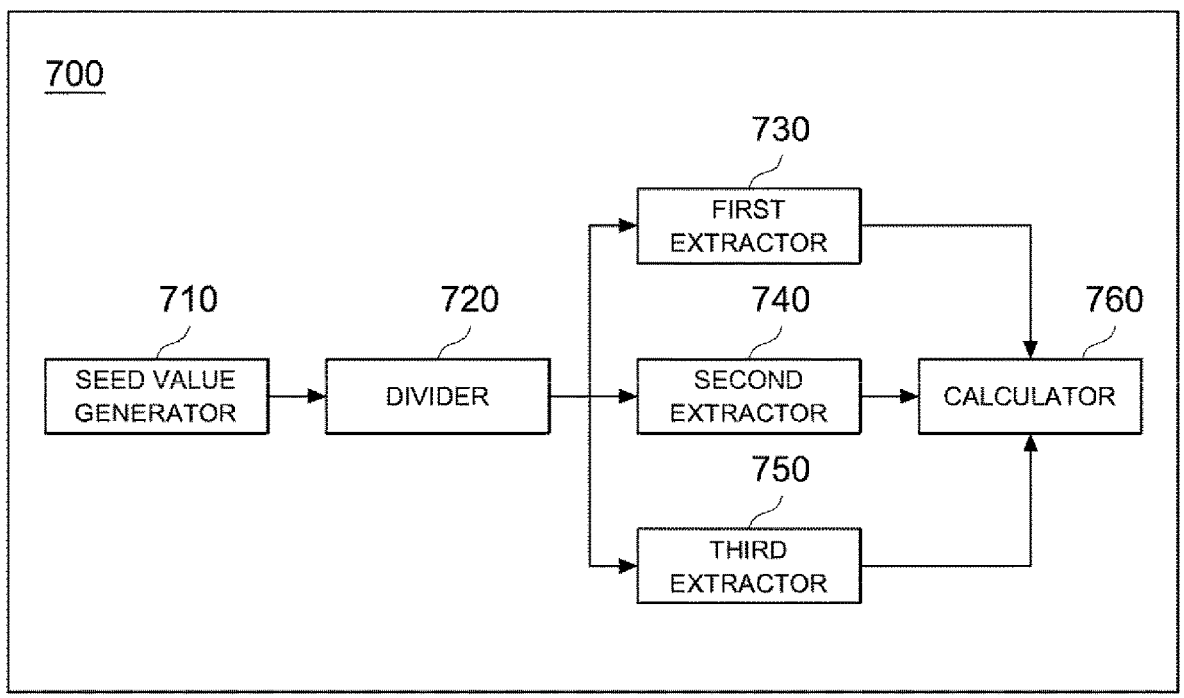
FIG. 7 is a configuration diagram illustrating a computation apparatus according to still another exemplary embodiment of the present disclosure.

FIG. 7 is a configuration diagram illustrating a computation apparatus according to another embodiment of the present disclosure.

Referring to FIG. 7, a computation apparatus 700 according to an exemplary embodiment of the present disclosure includes a seed value generator 710, a divider 720, a first extractor 730, a second extractor 740, a third extractor 750, and a calculator 760.

In the example shown in FIG. 7, the seed value generator 710, the divider 720, the first extractor 730, and the second extractor 740 have the same configurations as those of the seed value generator 410, the divider 420, the first extractor 430, and the second extractor 440, respectively, and thus detailed descriptions thereof will not be reiterated.

The third extractor 750 extracts a plurality of third parameter values that respectively correspond to a plurality of blocks generated by the divider 720 from a third parameter candidate value set including a plurality of third parameter candidate values generated using a plurality of second parameter candidate values included in a second parameter candidate value set.

According to an exemplary embodiment of the present disclosure, the third parameter candidate value set may include $2^n \times m$ third parameter candidate values, like in the first parameter candidate value set and the second parameter candidate value set. That is, the number of the third parameter candidate values included in the third parameter candidate value set may be changed according to a length of a seed value generated by the seed value generator 710 and the number of blocks generated by the divider 720.

In addition, according to an exemplary embodiment of the present disclosure, the third parameter candidate values included in the third parameter candidate value set are generated using the second parameter candidate values included in the second parameter candidate value set, and at least some of the third parameter candidate values included in the third parameter candidate value set may include a value multiplied by a secret key used for encryption or digital signature generation.

Specifically, the third parameter candidate values included in the third parameter candidate value set may be, for example, values obtained by multiplying each of the second parameter candidate values included in the second parameter candidate value set by the secret key.

In another example, some of the third parameter candidate values included in the third parameter candidate value set may be identical to some of the second parameter candidate values included in the second parameter candidate value set and the remaining third parameter candidate values in the third parameter candidate value set may be values obtained by multiplying each of the remaining second parameter candidate values in the second parameter candidate value set by the secret key.

According to an exemplary embodiment of the present disclosure, the third parameter candidate values included in the third parameter candidate value set may be indexed to one of $2^n$ different bit strings, each having a length of n bits, and a position of a block including the one of $2^n$ different bit strings in the seed value. Accordingly, the third extractor 750 may compare the bit string included in each of the blocks generated by the divider 720 and the position of each of blocks in the seed value with an index value of each of the third parameter candidate values included in the third parameter candidate value set to extract the corresponding third parameter candidate value as a third parameter value.

Meanwhile, each of the third parameter candidate values included in the third parameter candidate value set may have the same index value as that of a corresponding second parameter candidate value included in the second parameter candidate value set.

FIG. 8 is a table showing one example of the third parameter candidate value set according to an exemplary embodiment of the present disclosure.

Specifically, FIG. 8 shows an example of the third parameter candidate value set containing third parameter candidate values generated from the second parameter candidate values included in the second parameter candidate value set 210 shown in FIG. 2.

In the example shown in FIG. 8, a third parameter candidate value set 810 includes the same number (i.e., $2^8 \times 32$) of third parameter candidate values as the number of second parameter candidate values included in the second parameter candidate value set 210 shown in FIG. 2.

Specifically, the third parameter candidate values included in the third parameter candidate value set 810 are each indexed using one of 32 blocks and one of different bit strings, each having a length of 8 bits. In this case, each of the third parameter candidate values included in the third parameter candidate value set 810 has the same index value as that of the corresponding second parameter candidate value included in the second parameter candidate value set 210.

Meanwhile, except for third parameter candidate values (i.e., $cr_{1,32}$, $cr_{2,32}$, $cr_{3,32}$, ..., $cr_{255,32}$, $cr_{256,32}$) having "32 block" as index values in the third parameter candidate value set 810, the remaining third parameter candidate values have values equal to the second parameter candidate values of the second parameter candidate value set 210 that have the same index values as the third parameter candidate values.

Conversely, the third parameter candidate values (i.e., $cr_{1,32}$, $cr_{2,32}$, $cr_{3,32}$, $cr_{255,32}$, $cr_{256,32}$) having "32 block" as index values in the third parameter candidate value set 810 have values equal to values obtained by multiplying each of the second parameter candidate values (i.e., $r_{1,32}$, $r_{2,32}$, $r_{3,32}$, ..., $r_{255,32}$, $r_{256,32}$) in the second parameter candidate value set 210 that have the same index values as the third parameter candidate values by a secret key c.

Specifically, a third parameter candidate value $r_{1,1}$ included in the third parameter candidate value set 810 is the same as the second parameter candidate value $r_{1,1}$ included in the second parameter candidate value set 210 and is indexed to a bit string of "00000000" and the first block (i.e., 1 block).

In addition, a third parameter candidate value $cr_{1,32}$ is a third parameter candidate value generated by multiplying a second parameter candidate value $r_{1,32}$ in the second parameter candidate value set 210 by the secret key c and is indexed to the bit string of "00000000" and the $32^{nd}$ block (i.e., 32 block) in the same way as the second parameter candidate value $r_{1,32}$.

Meanwhile, in the example shown in FIG. 8, the third parameter candidate values (i.e., $cr_{1,32}$, $cr_{2,32}$, $cr_{3,32}$, ..., $cr_{255,32}$, $cr_{256,32}$) having "32 block" as index values are shown as having values generated by multiplying each of the second parameter candidate values (i.e., $r_{1,32}$, $r_{2,32}$, $r_{3,32}$, ..., $r_{255,32}$, $r_{256,32}$) having the same index values as those of the third parameter candidate values by the secret key c, but the third parameter candidate values are not limited thereto. Specifically, third parameter candidate values included in a third parameter candidate value set which have a specific block as index values may have values equal to values obtained by multiplying each of the second parameter candidate values having the identical block by the secret key c as index values.

FIG. 9 is a table showing another example of the third parameter candidate value set according to an exemplary embodiment of the present disclosure.

Specifically, FIG. 9 shows an example of the third parameter candidate value set including third parameter candidate values generated from the second parameter candidate values contained in the second parameter candidate value set 210 shown in FIG. 2.

In the example shown in FIG. 9, a third parameter candidate value set 910 includes the same number (i.e., $2^8 \times 32$) of third parameter candidate values as the number of second parameter candidate values in the second parameter candidate value set 210 shown in FIG. 2.

Specifically, the third parameter candidate values included in the third parameter candidate value set 910 are each indexed using one of 32 blocks and one of different bit strings, each having a length of 8 bits. In this case, each of the third parameter candidate values included in the third parameter candidate value set 910 has the same index value as that of a corresponding second parameter candidate value included in the second parameter candidate value set 210.

In addition, each of the third parameter candidate values included in the third parameter candidate value set 910 has a value equal to a value obtained by multiplying the corresponding second parameter candidate value having the same index value as that of the third parameter candidate value in the second parameter candidate value set 210 by the secret key c.

Specifically, in the example shown in FIG. 9, a third parameter candidate value $cr_{1,32}$ is a third parameter candidate value generated by multiplying the second parameter candidate value $r_{1,32}$ in the second parameter candidate value set 210 by the secret key c and is indexed to the bit string of "00000000" and the $32^{nd}$ block (i.e., 32 block) in the same way as the second parameter candidate value $r_{1,32}$.

In addition, a third parameter candidate value $cr_{255,32}$ is a third parameter candidate value generated by multiplying a second parameter candidate value $r_{255,32}$ in the second parameter candidate value set 210 by the secret key c and is indexed to the bit string of "11111110" and the $32^{nd}$ block (i.e., 32 block) in the same way as the second parameter candidate value $r_{255,32}$.

Figure 10:
FIG. 10 is a diagram illustrating one example of an extraction of the third parameter value according to an exemplary embodiment of the present disclosure.

FIG. 10 is a diagram illustrating one example of an extraction of the third parameter value according to an exemplary embodiment of the present disclosure.

In the example shown in FIG. 10, a seed value 1010 is the same as the seed values 310 and 610 shown in FIGS. 3 and 6 and that the divider 720 divides the seed value 1010 into 32 blocks, each having a length of 8 bits. In addition, a third parameter candidate value set 1030 is the same as the third parameter candidate value set 810 shown in FIG. 8.

In the example shown in FIG. 8, since a bit string included in the first block of the 32 blocks generated by dividing the seed value 1010 is "1111110," the third extractor 750 may extract a parameter candidate value $r_{255,1}$ that corresponds to "1 block" and the bit string of "1111110" from the third parameter candidate value set 1030 as a third parameter value corresponding to the first block.

In addition, since a bit string included in the second block of the blocks generated by dividing the seed value 1010 is "00000010," the third extractor 750 may extract a third parameter candidate value $r_{3,2}$ that corresponds to "2 block" and the bit string of "00000010" from the third parameter candidate value set 1030 as a third parameter value corresponding to the second block.

In the same way, the third extractor 750 may extract parameter values that respectively correspond to the 32 blocks generated by dividing the seed value 1010 from the third parameter candidate value set 1030.

Accordingly, $\{r_{255,1}, r_{3,2}, r_{13}, \ldots, r_{3,30}, r_{256,31}, cr_{255,32}\}$ are obtained as the third parameter values extracted by the third extractor 750 in the example shown in FIG. 10.

Figure 11:
FIG. 11 is a diagram illustrating another example of the extraction of the third parameter value according to an exemplary embodiment of the present disclosure.

FIG. 11 is a diagram illustrating another example of the extraction of the third parameter value according to an exemplary embodiment of the present disclosure.

In the example shown in FIG. 11, it is assumed that a seed value 1110 is the same as the seed values 310 and 610 shown in FIGS. 3 and 6 and that the divider 720 divides the seed value 1110 into 32 blocks, each having a length of 8 bits. In addition, it is assumed that a third parameter candidate value set 1130 is the same as the third parameter candidate value set 910 shown in FIG. 9.

In the example shown in FIG. 11, since a bit string included in the first block of the 32 blocks generated by dividing the seed value 1110 is "1111110," the third extractor 750 may extract a parameter candidate value $cr_{255,1}$ that corresponds to "1 block" and the bit string of "1111110" from the third parameter candidate value set 1130 as a third parameter value corresponding to the first block.

In addition, since a bit string included in the second block of the blocks generated by dividing the seed value 1110 is "00000010," the third extractor 750 may extract a third parameter candidate value $cr_{3,2}$ that corresponds to "2 block" and the bit string of "00000010" from the third parameter candidate value set 1130 as a third parameter value corresponding to the second block.

In the same way, the third extractor 750 may extract third parameter values that respectively correspond to the 32 blocks generated by dividing the seed value 1110 from the third parameter candidate value set 1130.

Accordingly, $\{cr_{255,1}, cr_{3,2}, cr_{1,3}, \ldots, cr_{3,30}, cr_{256,31}, cr_{255,32}\}$ are obtained as the third parameter values extracted by the third extractor 750 in the example shown in FIG. 11.

Referring back to FIG. 7, the calculator 760 generates a first random number using the first parameter values extracted by the first extractor 730, generates a second random number using the second parameter values extracted by the second extractor 740, and generates a third random number using the third parameter values extracted by the third extractor 750.

In this case, the generation of the first and second random numbers is described above, and thus redundant description will be omitted.

According to an exemplary embodiment of the present disclosure, the calculator 760 may generate the third random number by multiplying or adding the third parameter values extracted from the third parameter candidate value set with each other.

For example, the calculator 760 may use the following Equation 10 to generate a third random number cr from the third parameter values extracted in the example shown in FIG. 10.

$$cr = r_{255,1} \times r_{3,2} \times r_{1,3} \times \ldots \times r_{3,30} \times r_{256,31} \times cr_{255,32} \quad \text{[Equation 10]}$$

In another example, the calculator 760 may use the following Equation 11 to generate the third random number cr from the third parameter values extracted in the example shown in FIG. 11.

$$cr = cr_{255,1} + cr_{3,2} + cr_{1,3} + \ldots + cr_{3,30} + cr_{256,31} + cr_{255,32} \quad \text{[Equation 11]}$$

That is, the third random number cr generated by the calculator 760 is equal to the secret key c multiplied by the second random number r.

According to an exemplary embodiment, the calculator 760 may generate the third random number cr from the third parameter values using various forms of one-way function capable of generating a value equal to the second random number r multiplied by the secret key c, other than the addition or multiplication of the third parameter values.

Meanwhile, according to an exemplary embodiment of the present disclosure, one or more processors of the computing device 100 may encrypt data or generate a digital signature using the generated first random number k, second random number r, and third random number cr. According to exemplary embodiment, the calculator 760 may encrypt data or generate a digital signature using the generated first random number k, the second random number r, and the third random number cr. According to another exemplary embodiment, another component or another element of the one or more processors of the computing device 100 may encrypt data or generate a digital signature using the generated first random number k, second random number r, and third random number cr.

Specifically, the calculator 760 may encrypt data or generate a digital signature using various types of encryption algorithm or digital signature generation algorithm which require an exponentiation operation or a scalar multiplication operation of a point, and an operation of multiplying a value generated by performing the exponentiation operation or the scalar multiplication operation of a point by a secret key for encryption or digital signature generation. In this case, the calculator 760 may not directly perform the exponentiation operation or the scalar multiplication operation of a point, but may use the second random number r as a resulting value of the exponentiation operation or the scalar multiplication operation of a point. In addition, the calculator 760 may use the third random number cr as a resulting value of the multiplication of the second random number r and the secret key c without directly multiplying the second random number r by the secret key c. In this manner, according to an exemplary embodiment, since a direct exponentiation operation or a direct scalar multiplication operation of a point is not performed for a key exchange, an encryption, or a digital signature for encryption, exploitation of physical information leaked from devices by side-channel attacks during performance of mathematical computations is prevented.

For example, in the case in which the digital signature is generated using the DSA, as described above, the calculator 760 may use the first random number as the random integer k and use the second random number as the signature value r. In addition, the calculator 760 may generate the signature value s using the third random number obtained by performing another operation, such as an addition operation, which is secure against side-channel attack and uses the first random number and the third parameter values extracted from the third parameter candidate value set. That is, it is possible to generate the signature value r without performing an exponentiation operation using the random integer k and it is possible to generate the signature value s without performing an operation of multiplying the signature value r by the secret key c. Therefore, the random integer k used to generate the signature value r and the secret key c used to generate the signature value s cannot be obtained by performing a side-channel attack.

In another example, in the case in which the digital signature is generated using the ECDSA, as described above, the calculator 760 may use the first random number as the random integer k and use the second random number as the signature value r. In addition, the calculator 760 may generate the signature value s using the third random number obtained by performing another operation, such as a multiplication operation, which is secure against side-channel attack and uses the first random number and the third parameter values extracted from the third parameter candidate value set. That is, it is possible to generate the signature value r without performing a scalar multiplication operation of a point using the random integer k and it is possible to generate the signature value s without performing an operation of multiplying the signature value r by the secret key c. Therefore, the random integer k used to generate the signature value r and the secret key c used to generate the signature value s cannot be obtained through a side-channel attack.

Meanwhile, in an exemplary embodiment, the seed value generator 710, the divider 720, the first extractor 730, the second extractor 740, the third extractor 750, and the calculator 760, which are shown in FIG. 7, may be implemented on one or more computing devices including one or more processors and a computer-readable recording medium connected to the one or more processors. The computer-readable recording medium may be provided inside or outside the processor, and may be connected to the processor by various well-known means. The processor in the computing device may enable the computing device to operate according to the exemplary embodiments described in the specification. For example, the processor may execute instructions stored in the computer readable recording medium, and the instructions stored in the computer readable recording medium may cause a series of operational steps to be performed on the computing device according to the exemplary embodiments of the present disclosure described in the specification when executed by the processor.

Figure 12:
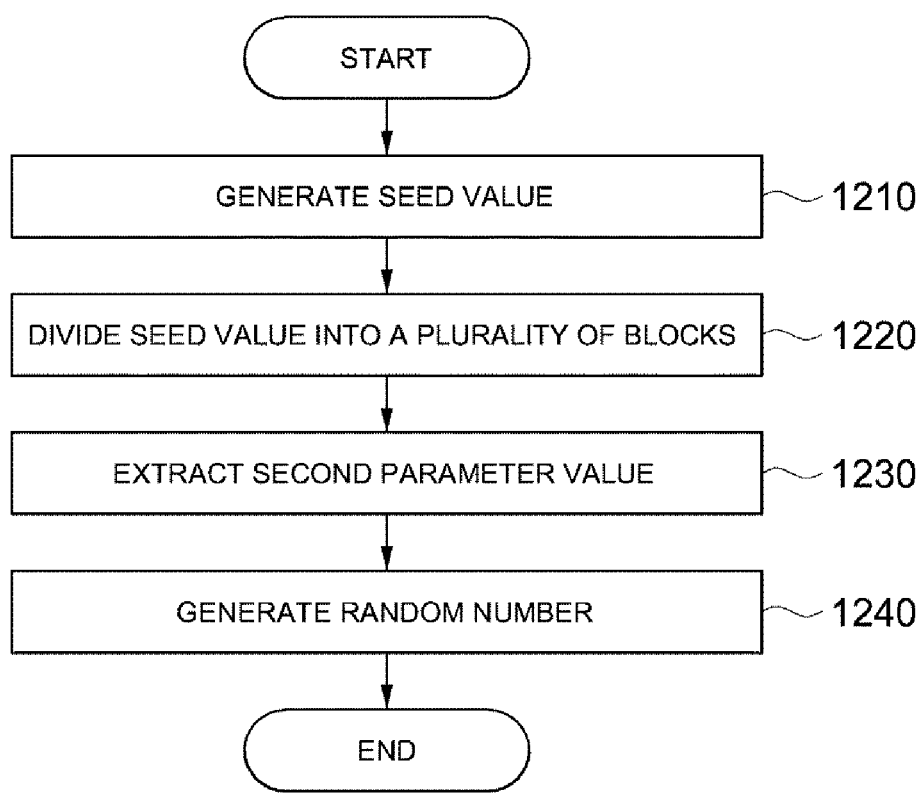
FIG. 12 is a flowchart illustrating a computation method according to an exemplary embodiment of the present disclosure.

FIG. 12 is a flowchart illustrating a computation method according to an exemplary embodiment of the present disclosure.

The computation method shown in FIG. 12 may be performed by the computation apparatus 100 illustrated in FIG. 1.

Referring to FIG. 12, the computation apparatus 100 generates a seed value (1210). According to an exemplary embodiment, the seed value may be formed by a random bit string.

Then, the computation apparatus 100 divides the generated seed value into a plurality of blocks (1220).

The computation apparatus 100 extracts a plurality of second parameter values that respectively correspond to the plurality of generated blocks from a second parameter candidate value set including a plurality of second parameter candidate values generated from a plurality of first parameter candidate values (1230).

In this case, according to an exemplary embodiment of the present disclosure, the second parameter candidate values included in the second parameter candidate value set may be values obtained by performing an exponentiation operation using each of the plurality of first parameter candidate values as an exponent or by performing a scalar multiplication operation of a point using each of the plurality of first parameter candidate values as a scalar multiplier.

In addition, according to an exemplary embodiment, the computation apparatus 100 may extract second parameter values respectively corresponding to bit strings in the plurality of generated blocks and positions of the blocks in the seed value, from the second parameter candidate value set.

Thereafter, the computation apparatus 100 generates a random number from the second parameter values (1240).

In this case, according to an exemplary embodiment of the present disclosure, the computation apparatus 100 may generate the random number by multiplying or adding the second parameter values with each other.

Meanwhile, according to an exemplary embodiment of the preset disclosure, the computation apparatus 100 may encrypt data or generate a digital signature using the generated random number.

Figure 13:
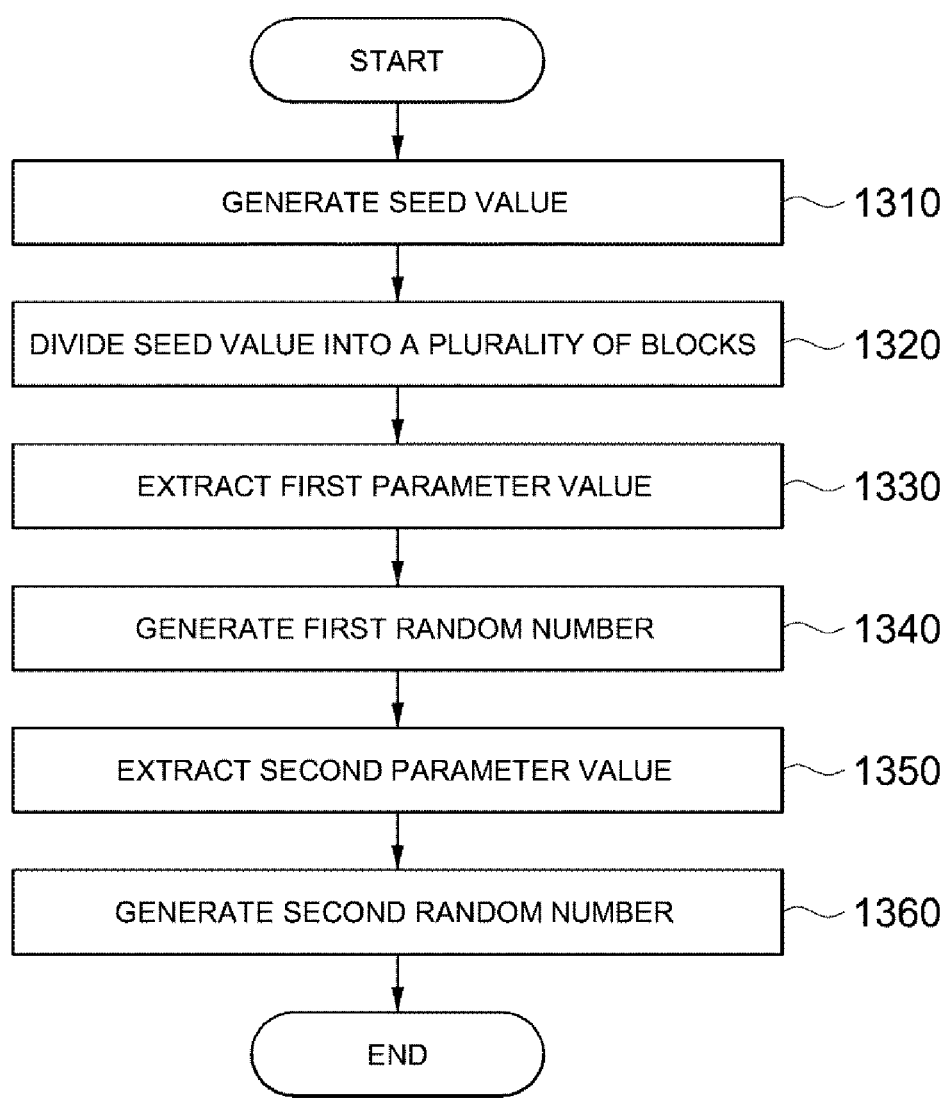
FIG. 13 is a flowchart illustrating a computation method according to another exemplary embodiment of the present disclosure.

FIG. 13 is a flowchart illustrating a computation method according to another exemplary embodiment of the present disclosure.

The computation method shown in FIG. 13 may be performed by the computation apparatus 400 shown in FIG. 4.

Referring to FIG. 13, the computation apparatus 400 generates a seed value (1310). According to an exemplary embodiment, the seed value may be formed by a random bit string.

Then, the computation apparatus 400 divides the generated seed value into a plurality of blocks (1320).

The computation apparatus 400 extracts a plurality of first parameter values that respectively correspond to the plurality of generated blocks from a first parameter candidate value set including a plurality of first parameter candidate values (1330).

In this case, according to an exemplary embodiment of the present disclosure, the computation apparatus 400 may extract first parameter values respectively corresponding to bit strings in the plurality of generated blocks and positions of the blocks in the seed value from the first parameter candidate value set.

Then, the computation apparatus 400 generates a first random number from the first parameter values (1340).

In this case, according to an exemplary embodiment of the present disclosure, the computation apparatus 400 may generate the first random number by adding the first parameter values to each other.

Then, the computation apparatus 400 extracts a plurality of second parameter values that respectively correspond to the plurality of generated blocks from a second parameter candidate value set including a plurality of second parameter candidate values generated using the plurality of first parameter candidate values included in the first parameter candidate value set (1350).

In this case, according to an exemplary embodiment of the present disclosure, the second parameter candidate values included in the second parameter candidate value set may be values obtained by performing an exponentiation operation using each of the plurality of first parameter candidate values included in the first parameter candidate value set as an exponent or by performing a scalar multiplication operation of a point using each of the plurality of first parameter candidate values as a scalar multiplier.

In addition, according to an exemplary embodiment, the computation apparatus 400 may extract second parameter values respectively corresponding bit strings in the plurality of generated blocks and positions of the blocks in the seed value, from the second parameter candidate value set.

Thereafter, the computation apparatus 400 generates a second random number from the second parameter values (1360).

According to an exemplary embodiment of the present disclosure, the computation apparatus 400 may generate the second random number by multiplying or adding the second parameter values with each other.

Meanwhile, according to an exemplary embodiment of the preset disclosure, the computation apparatus 400 may encrypt data or generate a digital signature using the generated first and second random numbers.

FIG. 14 is a flowchart illustrating a computation method according to another exemplary embodiment of the present disclosure.

The computation method shown in FIG. 14 may be performed by the computation apparatus 700 shown in FIG. 7.

Referring to FIG. 14, the computation apparatus 700 generates a seed value (1410). According to an exemplary embodiment, the seed value may be formed by a random bit string.

Then, the computation apparatus 700 divides the generated seed value into a plurality of blocks (1420).

Then, the computation apparatus 700 extracts a plurality of first parameter values that respectively correspond to the plurality of generated blocks from a first parameter candidate value set including a plurality of first parameter candidate values (1430).

In this case, according to an exemplary embodiment of the present disclosure, the computation apparatus 700 may extract first parameter values respectively corresponding to bit strings in the plurality of generated blocks and positions of the blocks in the seed value, from the first parameter candidate value set.

Then, the computation apparatus 700 generates a first random value from the first parameter values (1440).

In this case, according to an exemplary embodiment of the present disclosure, the computation apparatus 700 may generate the first random number by adding the first parameter values to each other.

Then, the computation apparatus 700 extracts a plurality of second parameter values corresponding to the plurality of generated blocks from a second parameter candidate value set including the plurality of second parameter candidate values generated using each of the plurality of first parameter candidate values included in the first parameter candidate value set (1450).

In this case, according to an exemplary embodiment of the present disclosure, the second parameter candidate values included in the second parameter candidate value set may be values obtained by performing an exponentiation operation using each of the plurality of first parameter candidate values included in the first parameter candidate value set as an exponent or by performing a scalar multiplication operation of a point using each of the plurality of first parameter candidate values as a scalar multiplier.

In addition, according to an exemplary embodiment, the computation apparatus 700 may extract second parameter values respectively corresponding to bit strings in each of the plurality of generated blocks and positions of the blocks in the seed value, from the second parameter candidate value set.

Thereafter, the computation apparatus 700 generates a second random number from the second parameter values (1460).

In this case, according to an exemplary embodiment of the present disclosure, the computation apparatus 700 may generate the second random number by multiplying or adding the second parameter values with each other.

Thereafter, the computation apparatus 700 extracts a plurality of third parameter values corresponding to the plurality of generated blocks from a third parameter candidate value set including a plurality of third parameter candidate values generated using each of the plurality of second parameter candidate values included in the second parameter candidate value set (1470).

In this case, according to an exemplary embodiment of the present disclosure, at least some of the third parameter candidate values included in the third parameter candidate value set may include values obtained by multiplying at least some of the second parameter candidate values included in the second parameter candidate value set by a secret key.

In addition, according to an exemplary embodiment of the present disclosure, the computation apparatus 700 may extract third parameter values corresponding to bit strings in the plurality of generated blocks and positions of the blocks in the seed value, from the third parameter candidate value set.

Thereafter, the computation apparatus 700 generates a third random number form the third parameter values (1480).

In this case, according to an exemplary embodiment of the present disclosure, the computation apparatus 700 may generate the third random number by multiplying or adding the third parameter values with each other.

Meanwhile, according to an exemplary embodiment of the preset disclosure, the computation apparatus 700 may encrypt data or generate a digital signature using the generated first, second, and third random numbers.

While the flowcharts shown in FIGS. 12 to 14 illustrate the method as being performed in a plurality of operations, at least some of the operations may be performed in a different order, performed in combination with each other, omitted, performed in sub-operations, or performed with at least one operation that is not illustrated being added thereto.

According to the exemplary embodiments of the present disclosure, it is possible to generate values equal to values obtained by performing an exponentiation operation or a scalar multiplication operation of a point using values extracted from previously generated parameter candidate value sets and an operation secure against side-channel attack, thereby improving security against side-channel attack without degrading performance.

Methods according to various exemplary embodiments of the present disclosure described above may be embodied as an application type that may be installed in electronic devices, i.e., IoT devices.

The methods according to the various exemplary embodiments of the present disclosure described above may also be embodied by merely upgrading software or hardware of electronic devices, i.e., IoT devices.

According to an exemplary embodiment, the elements, components, methods or operations described herein may be implemented using hardware components, software components, or a combination thereof. For example, the hardware components may include a processing device. According to an exemplary embodiment, the display apparatus may include a processing device, such as the image processor or the controller, that may be implemented using one or more general-purpose or special purpose computers, such as, for example, a hardware processor, a CPU, a hardware controller, an ALU, a DSP, a microcomputer, an FPGA, a PLU, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

Meanwhile, the exemplary embodiments of the present disclosure may include a computer readable recording medium including a program for executing methods described in this specification on a computer. The computer readable recording medium may include a program instruction, a local data file, a local data structure, and/or combinations and sub-combinations thereof. The medium may be specially designed and constructed for the purpose of the present disclosure, or may be well-known and available to those having skill in the computer software arts. Examples of the computer readable recording medium include magnetic media such as a hard disk, a floppy disk, and a magnetic tape, optical media such as a compact disc read-only memory (CD-ROM) and a digital versatile disc (DVD)-ROM, magneto-optical media such as a floptical disk, and a hardware device such as a read only memory (ROM), random-access memory (RAM), and a flash memory, which is specially designed to store and execute program commands. Examples of the program commands include an advanced language code which the computer can execute using an interpreter as well as a machine language code made by compilers.

Each of elements according to the above-described various exemplary embodiments (e.g., modules or programs) may include a single entity or a plurality of entities, and some of corresponding sub elements described above may be omitted or other types of sub elements may be further included in the various exemplary embodiments. Alternatively or additionally, some elements (e.g., modules or programs) may be integrated into one entity and then may equally or similarly perform a function performed by each of corresponding elements that are not integrated. Operations performed by modules, programs, or other types of elements according to the various exemplary embodiments may be sequentially, in parallel, or heuristically executed or at least some operations may be executed in different sequences or may be omitted, or other types of operations may be added.

While the present disclosure has been described in detail above with reference to representative exemplary embodiments, it should be understood by those skilled in the art that the exemplary embodiments may be variously modified without departing from the scope of the present disclosure. Therefore, the scope of the present disclosure is defined not by the described exemplary embodiments but by the appended claims and encompasses equivalents that fall within the scope of the appended claims.

What is claimed is:

1. An apparatus comprising:
a hardware processor configured to execute:
a seed value generator configured to generate a seed value;
a divider configured to divide the seed value into a plurality of blocks;
a first extractor configured to extract a plurality of first parameter values from a first parameter candidate value set including a plurality of first parameter candidate values, each of the plurality of first parameter values respectively corresponding to one of the plurality of divided blocks;
a second extractor configured to extract a plurality of second parameter values from a second parameter candidate value set including a plurality of second parameter candidate values generated by using each of the plurality of first parameter candidate values included in the first parameter candidate value set, each of the plurality of second parameter values respectively corresponding to one of the plurality of divided blocks;
a third extractor configured to extract a plurality of third parameter values from a third parameter candidate value set including a plurality of third parameter candidate values generated by using each of the plurality of second parameter candidate values included in the second parameter candidate value set, each of the plurality of third parameter values respectively corresponding to one of the plurality of divided blocks; and
a calculator configured to generate a first random number based on the plurality of first parameter values, generate a second random number based on the plurality of second parameter values, and generate a third random number based on the plurality of third parameter values,
wherein each of the plurality of second parameter candidate values included in the second parameter candidate value set is generated by performing an exponentiation operation using a corresponding one of the plurality of first parameter candidate values included in the first parameter candidate value set as an exponent or by performing a scalar multiplication operation of a point using a corresponding one of the plurality of first parameter candidate values included in the first parameter candidate value set as a scalar multiplier,
wherein the hardware processor is further configured to encrypt data or generate a digital signature for the data based on at least one of the first random number, the second random number and the third random number.

2. The apparatus of claim 1, wherein
the first extractor is further configured to extract the plurality of first parameter values respectively corresponding to bit strings of the plurality of divided blocks and positions of the blocks in the seed value, from the first parameter candidate value set,
the second extractor is further configured to extract the plurality of second parameter values respectively corresponding to bit strings of the plurality of divided blocks and positions of the blocks in the seed value, from the second parameter candidate value set, and
the third extractor is further configured to extract the plurality of third parameter values respectively corresponding to bit strings of the plurality of divided blocks and positions of the blocks in the seed value, from the third parameter candidate value set.

3. The apparatus of claim 1, wherein the calculator generates the first random number by adding the plurality of first parameter values to each other.

4. The apparatus of claim 1, wherein the second random number is equal to a value obtainable by performing an exponentiation operation using the first random number as an exponent or by performing a scalar multiplication operation of a point using the first random number as a scalar multiplier and using the plurality of second parameter values.

5. The apparatus of claim 4, wherein at least one of the plurality of third parameter candidate values included in the third parameter candidate value set are obtained by multiplying at least one of the second parameter candidate values included in the second parameter candidate value set by a secret key.

6. The apparatus of claim 5, wherein the third random number is equal to a product of the second random number and the secret key.

7. The apparatus of claim 6, wherein the hardware processor is further configured to encrypt the data or generate the digital signature for the data based on the first random number, the second random number, and the third random number.

8. The apparatus of claim 1, wherein the seed value comprises a random bit string.

9. A method, comprising:
generating a seed value;
dividing the seed value into a plurality of blocks;
extracting a plurality of first parameter values from a first parameter candidate value set including a plurality of first parameter candidate values, each of the plurality of first parameter values respectively corresponding to one of the plurality of divided blocks;
extracting a plurality of second parameter values from a second parameter candidate value set including a plurality of second parameter candidate values generated by using each of the plurality of first parameter candidate values included in the first parameter candidate value set, each of the plurality of second parameter values respectively corresponding to one of the plurality of divided blocks;
extracting a plurality of third parameter values from a third parameter candidate value set including a plurality of third parameter candidate values generated by using each of the plurality of second parameter candidate values included in the second parameter candidate value set, each of the plurality of third parameter values respectively corresponding to one of the plurality of divided blocks;
generating a first random number based on the plurality of first parameter values;
generating a second random number based on the plurality of second parameter values;
generating a third random number based on the plurality of third parameter values; and
applying at least one of the first random number, the second random number and the third random number to encrypt data or generate a digital signature for the data,
wherein each of the plurality of second parameter candidate values included in the second parameter candidate value set is generated by performing an exponentiation operation using a corresponding one of the plurality of first parameter candidate values included in the first parameter candidate value set as an exponent or by performing a scalar multiplication operation of a point using a corresponding one of the plurality of first parameter candidate values included in the first parameter candidate value set as a scalar multiplier.

10. The method of claim 9, wherein
the extracting of the extracted plurality of first parameter values extracts the plurality of first parameter values respectively corresponding to bit strings of the plurality of divided blocks and positions of the blocks in the seed value, from the first parameter candidate value set,
the extracting of the extracted plurality of second parameter values extracts the plurality of second parameter values respectively corresponding to bit strings of the plurality of divided blocks and positions of the blocks in the seed value, from the second parameter candidate value set, and
the extracting of the extracted plurality of third parameter values extracts the plurality of third parameter values respectively corresponding to bit strings of the plurality of divided blocks and positions of the blocks in the seed value, from the third parameter candidate value set.

11. The method of claim 9, wherein the generating of the first random number generates the first random number by adding the plurality of first parameter values to each other.

12. The method of claim 9, the second random number is equal to a value obtainable by performing an exponentiation operation using the first random number as an exponent or by performing a scalar multiplication operation of a point using the first random number as a scalar multiplier and using the plurality of second parameter values.

13. The method of claim 12, wherein at least one of the plurality of third parameter candidate values included in the third parameter candidate value set are values obtained by multiplying at least one of the second parameter candidate values included in the second parameter candidate value set by a secret key.

14. The method of claim 13, wherein the third random number is equal to a product of the second random number and the secret key.

15. The method of claim 14, wherein the encrypting the data or the generating the digital signature is based on the first random number, the second random number, and the third random number.

16. The method of claim 9, wherein the seed value comprises a random bit string.

17. A non-transitory computer readable medium having stored thereon a program for causing a computer to execute a method of claim 9.

18. An apparatus comprising:
a hardware processor configured to execute:
receive a seed value;
divide the seed value into a plurality of blocks;
extract, for each of the plurality of blocks, a first parameter value from a first parameter candidate value set comprising a plurality of first parameter candidate values, by using a number of the respective block and a value in the respective block as a first index;
extract, for each of the plurality of blocks, a second parameter value from a second parameter candidate value set comprising a plurality of second parameter candidate values generated by using the plurality of first parameter candidate values, by using a number of the respective block and a value in the respective block as a second index;
extract, for each of the plurality of blocks, a third parameter value from a third parameter candidate value set comprising a plurality of third parameter candidate values generated by using the plurality of second parameter candidate values, by using a number of the respective block and a value in the respective block as a first third;

generate a first random number based on the first parameter values for each of the plurality of blocks;

generate a second random number based on the second parameter values for each of the plurality of blocks;

generate a third random number based on the third parameter values for each of the plurality of blocks; and apply at least one of the first random number, the second random number and the third random number to encrypt data or generate a digital signature for the data, wherein each of the plurality of second parameter candidate values included in the second parameter candidate value set is generated by performing an exponentiation operation using a corresponding one of the plurality of first parameter candidate values included in the first parameter candidate value set as an exponent or by performing a scalar multiplication operation of a point using a corresponding one of the plurality of first parameter candidate values included in the first parameter candidate value set as a scalar multiplier.

19. The apparatus of claim 18, wherein at least one of a number of the first parameter candidate values included in the first parameter candidate value set, a number of the second parameter candidate values included in the second parameter candidate value set, and a number of the third parameter candidate values included in the third parameter candidate value set, changes according to a length of the seed value and a total number of the plurality of blocks.

* * * * *